(12) United States Patent
May et al.

(10) Patent No.: US 7,310,876 B2
(45) Date of Patent: Dec. 25, 2007

(54) METHOD FOR MAKING A PISTON BODY

(75) Inventors: Ewald May, Bonn (DE); Rainer Schmitt, Wachtberg (DE)

(73) Assignee: GKN Sinter Metals GmbH (DE)

( * ) Notice: Subject to any disclaimer, the term of this patent is extended or adjusted under 35 U.S.C. 154(b) by 0 days.

(21) Appl. No.: 11/091,246

(22) Filed: Mar. 28, 2005

(65) Prior Publication Data
US 2005/0167220 A1 Aug. 4, 2005

Related U.S. Application Data

(63) Continuation of application No. PCT/EP03/09670, filed on Aug. 30, 2003.

(51) Int. Cl.
*B23P 15/10* (2006.01)
*F16F 9/00* (2006.01)

(52) U.S. Cl. .............................. 29/888.04; 188/322.22

(58) Field of Classification Search ............. 29/888.04, 29/888.041; 419/28; 188/322.22, 322.18
See application file for complete search history.

(56) References Cited

U.S. PATENT DOCUMENTS 3,212,411 A 10/1965 Storms ....................... 92/248
4,483,820 A * 11/1984 Schelb ......................... 419/28
4,707,351 A * 11/1987 Lord et al. ................ 423/648.1
2004/0175285 A1* 9/2004 Hattori et al. ................. 419/28

FOREIGN PATENT DOCUMENTS

| DE | 198 47 342 A1 | 8/2000 |
|----|---------------|--------|
| DE | 101 08 246 A1 | 9/2002 |
| EP | 0 682 190 B1  | 4/1998 |
| EP | 0 658 611 B1  | 9/1999 |
| WO | WO 00/34681   | 6/2000 |

* cited by examiner

*Primary Examiner*—John C. Hong
(74) *Attorney, Agent, or Firm*—Woodcock Washburn LLP

(57) ABSTRACT

A method for producing a one-part piston body for a piston-cylinder arrangement, in particular a shock absorber piston, is disclosed. The method may include in a first step, pressing a green compact comprising a revolving web and longitudinal support webs from a sinterable metallurgical powder. In a second step, the green compact may be sintered to form a blank. In a third step, radially disposed stamping tools may be used to form, under material displacement, transverse grooves into at least a part of the support webs through cold deformation. In a fourth step, the blank provided with transverse grooves may be calibrated to its final form through pressing with calibrating tools.

12 Claims, 7 Drawing Sheets

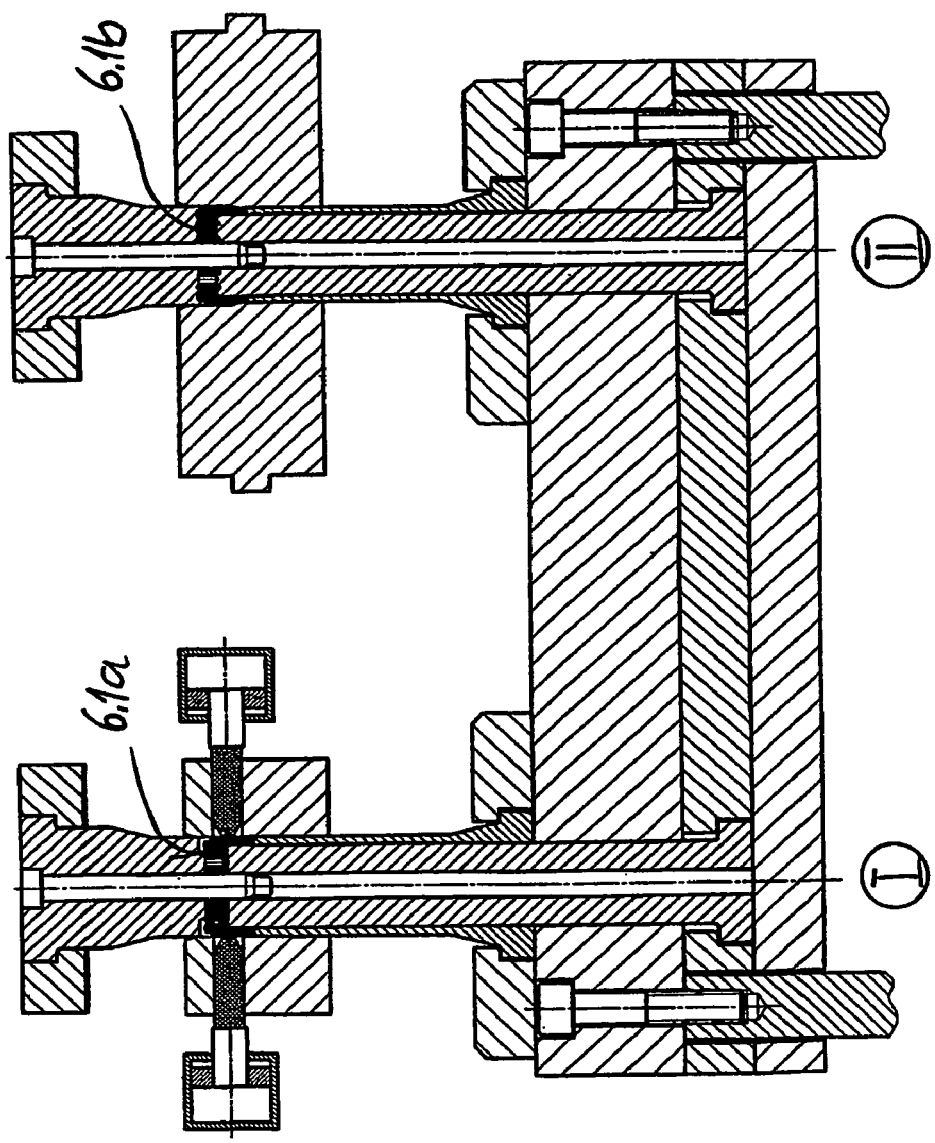

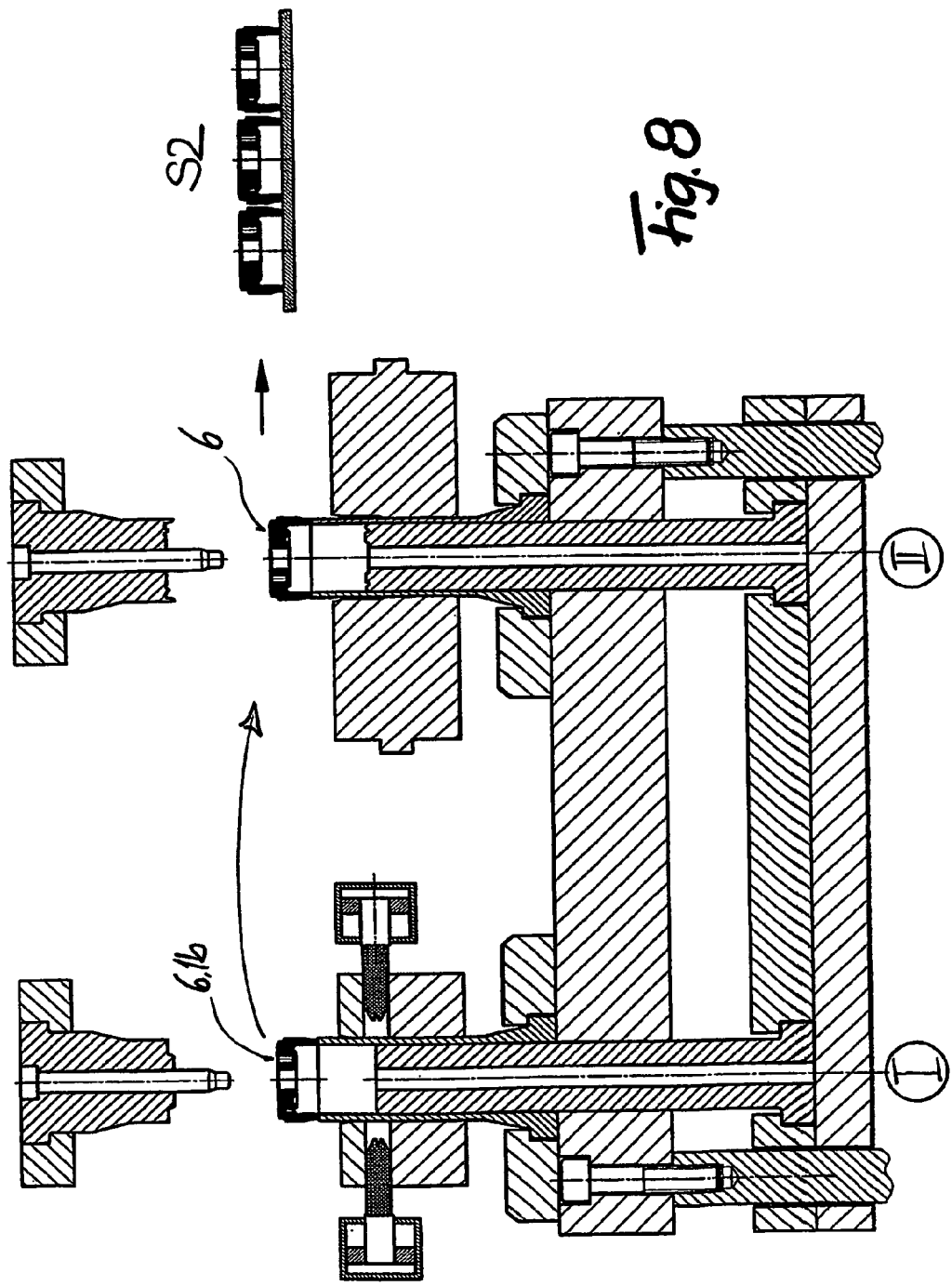

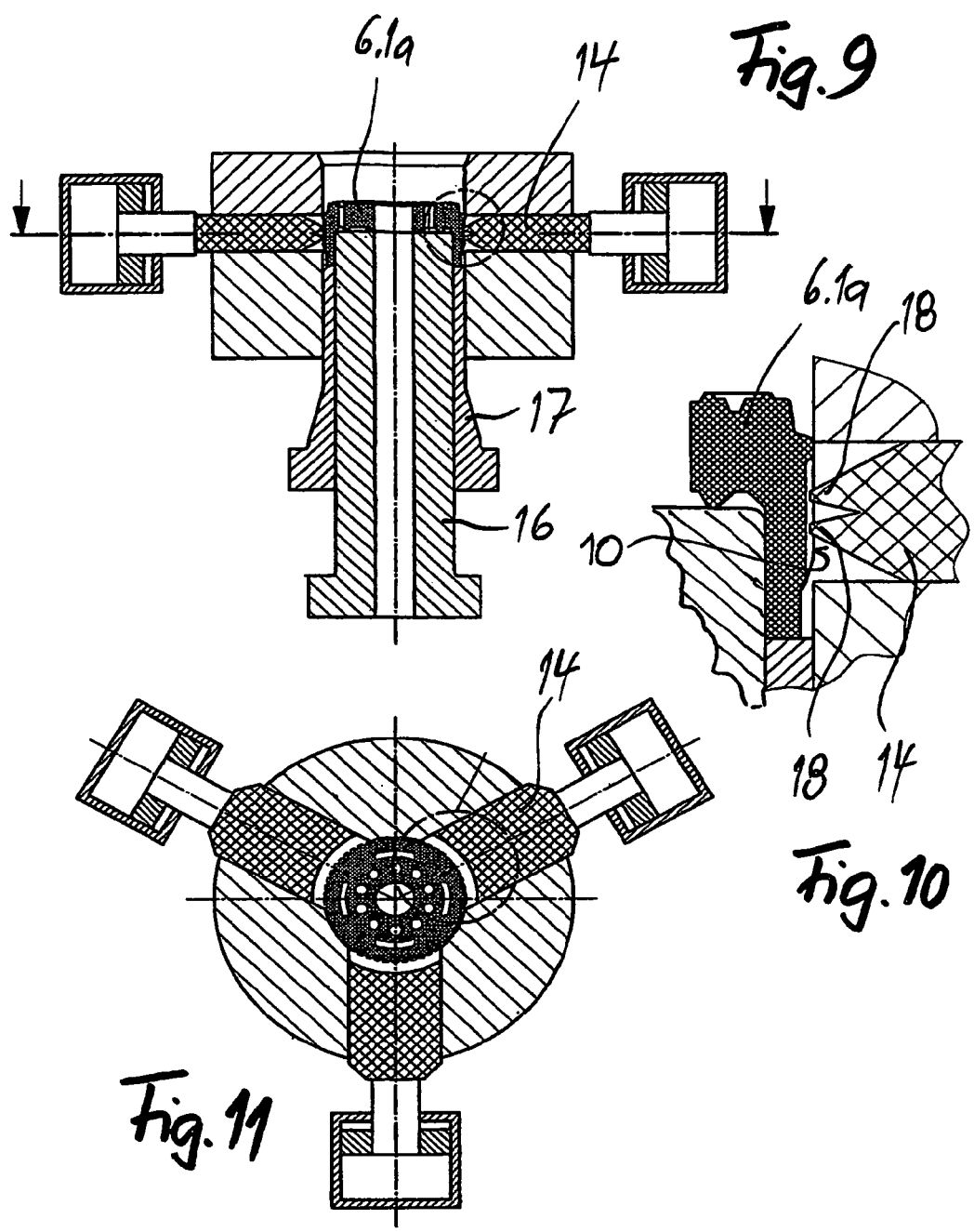

METHOD FOR MAKING A PISTON BODY

CROSS-REFERENCE TO RELATED APPLICATION

The present application is a Continuation of PCT Application No. PCT/EP2003/009670, filed Aug. 30, 2003, which claims priority to German Application No. 102 45 404.3 filed Sep. 28, 2002, hereby incorporated by reference in its entirety.

FIELD OF THE INVENTION

This invention relates to pistons and methods of forming same, and more particularly, to shock absorber pistons formed by powder metallurgy and related processing.

BACKGROUND

From EP-A-0 658 611, a shock absorber piston is known that is provided with a revolving web on its peripheral surface, a multiplicity of webs that run in the axial direction being adjacent to or connected to one side of this revolving web. Using an injection molding method, a thermoplastic plastic seal is sprayed onto this piston body, and in particular the webs extending in the axial direction act, with their intermediate grooves filled with sealing material, to reliably anchor the sealing material and to guide the piston. The sealing applied in the injection molding enables a narrow tolerance in order to avoid what is known as "blow-by" and thus to effect a reliable sealing of the mutually associated cylinder chambers. The method for manufacturing seals that are injection-molded in this way is relatively expensive.

From U.S. Pat. No. 3,212,411, a piston-cylinder arrangement is known whose piston body has a multiplicity of revolving grooves on its peripheral surface. In order to apply the seal, a cup-shaped preform made of PTFE (polytetrafluorethylene) is provided that is first placed loosely on the piston body. The piston body prepared in this way is subsequently first pressed into a highly heated shaping and calibrating cylinder, where the PTFE material is pressed into the grooves on the peripheral surface of the piston body under the influence of heat. Subsequently, the piston body with the pressed-on seal is cooled in a correspondingly fashioned cooling cylinder. The grooves are filled completely with the sealing material, in order to bring about a positive, fixed connection of the seal with the peripheral surface of the piston body. For use as a shock absorber piston, the base surface of the preform, still covering the final piston area or end surface of the piston body on one side, must subsequently be removed.

From EP-A-682 190, a shock absorber piston is known that differs in its manufacture from the above-described method essentially only in that a stamped annular disc is used to apply the seal, instead of a cup-shaped preform. This annular disc is placed on one end of the piston body. The piston body prepared in this way is again pressed into a heated shaping and calibration cylinder, and the annular disc is placed around the peripheral surface of the piston body as a band and is subsequently pressed into the grooves running in the peripheral direction of the piston body under the influence of heat. Subsequently, the piston, with its pressed-on seal, is guided through a cooling tube. Here as well, the sealing material fills the grooves practically completely, so that the sealing is connected in positive, fixed fashion with the peripheral surface of the piston body.

The two methods described above have the disadvantage that considerable pressure can be required for the deforming and the complete pressing of the sealing material into the grooves on the peripheral surface of the piston body, and that the sealing material that forms the seal is subjected to strong deformations that disadvantageously influence the structure of the sealing material.

From DE-A-198 47 342, a piston is known for a piston-cylinder arrangement, in particular a shock absorber piston, having a piston body that is provided, on its peripheral surface in an area adjacent to one end of the piston, with a revolving web that protrudes beyond the peripheral surface, to which longitudinal support webs are adjacent that run in the direction towards the other end of the piston, disposed in parallel to one another and at a distance from one another, each pair of adjacent support webs delimiting a groove-shaped recess that is open at its ends opposite the revolving web in the longitudinal direction, and having a collar-shaped seal made of a thermally deformable sealing material that is formed onto the piston body in such a way that both the revolving web and the support webs are formed into the material of the seal only over a part of their vertical direction or height.

This known solution has shown that for a good sealing between the collar-shaped seal of the piston on the one hand and the external contour of the piston body on the other hand, it is not required for the seal to lie tightly against the piston body over the full periphery. For many cases of application, it is sufficient if the sealing collar lies tightly only on the relatively narrow revolving web in the peripheral direction. In addition, it has turned out, surprisingly, that for a problem-free and reliable connection between the seal and the piston body it is not required that the groove-shaped recesses between the longitudinal support webs be filled completely by the sealing material. In this way, there remains a sufficient open space into which the sealing material can escape in case of expansion due to increases in temperature, while the piston is nonetheless guided in a problem-free manner via the longitudinal support webs.

In some circumstances, the provision of only one revolving web protruding from the peripheral surface for the fixing of the collar-shaped seal may not be sufficient, so that it is desirable to provide two revolving webs, one at each end, that are connected by the longitudinal support webs that run parallel to one another and at a distance from one another. However, the powder-metallurgical production of such a piston body by pressing a green compact from a sinterable metal powder, with subsequent sintering, presents significant forming problems, so that in DE-A-101 08 246 it was proposed to divide the piston body into two sub-bodies, each having at one end a revolving web from which the longitudinal support webs situated at a distance from one another emanate. The two sub-bodies can be formed without great difficulty from a sinterable metal powder as green compacts, and then sintered. The complete piston is then assembled from the two finally sintered parts in such a way that the revolving webs are each situated at an end of the piston facing away from the dividing plane. By beveling the support webs at their end facing the dividing plane, it is then possible to provide an additional transverse groove. The disadvantage of this design is that the joining process for the two sub-bodies is expensive, if these have to be joined with a defined position to one another. This is for example the case for piston bodies for shock absorber pistons, because here the partial channels present in the two sub-bodies must be precisely aligned with one another.

The present invention is based on the object of creating a piston that is simple to manufacture, in particular a shock absorber piston.

SUMMARY

According to the present invention, this object is achieved by a one-part piston body that is provided on its peripheral surface in an area adjacent to a final or terminal piston area, with a revolving web that protrudes beyond the peripheral surface, to which longitudinal support webs are adjacent that extend to the other final piston area and that are disposed parallel to and at a distance from each other. At least a part of the support webs are provided with at least one transverse groove, and preferably two transverse grooves, between the two final or terminal piston areas. Each pair of adjacent support webs delimit a groove-shaped recess. The ends opposite the revolving web of the recesses are open in the longitudinal direction. A collar-shaped seal made of a thermally deformable sealing material is able to be formed onto the piston body in such a way that both the revolving web and also the support webs are formed into the material of the collar-shaped seal at least over a part of their vertical direction. Preferably, the piston body is powder-metallurgically produced for a piston-cylinder arrangement, in particular a shock absorber piston.

A method for manufacturing the piston body according to the present invention includes in a first step a green compact comprising the revolving web and the longitudinal support webs is pressed from a sinterable metallurgical powder, and in a second step the green compact is finally sintered to form a blank, and in a third step radially disposed stamping tools are used to form, under material displacement, transverse grooves into at least a part of support webs through cold deformation, and that in a fourth step the blank provided in this way with transverse grooves is calibrated to its final form through pressing with calibrating tools.

Further constructions of the present invention are indicated in the following description of exemplary embodiments and in the subclaims.

BRIEF DESCRIPTION OF THE FIGURES

The present invention is explained in more detail on the basis of schematic drawings of an exemplary embodiment.

FIG. 7 shows the device according to FIG. 6 during the forming and calibration step, FIG. 8 shows the device according to FIG. 6 at the end of the forming and calibration step, FIG. 9 shows a vertical section through the forming station of the tool according to FIG. 6 with the inserted blank during the forming process, FIG. 10 shows an enlarged view of the construction of the stamping tool, FIG. 11 shows a view of the forming station according to FIG. 9, with an arrangement of the stamping tools.

DETAILED DESCRIPTION OF PREFERRED EMBODIMENTS

Figure 1:
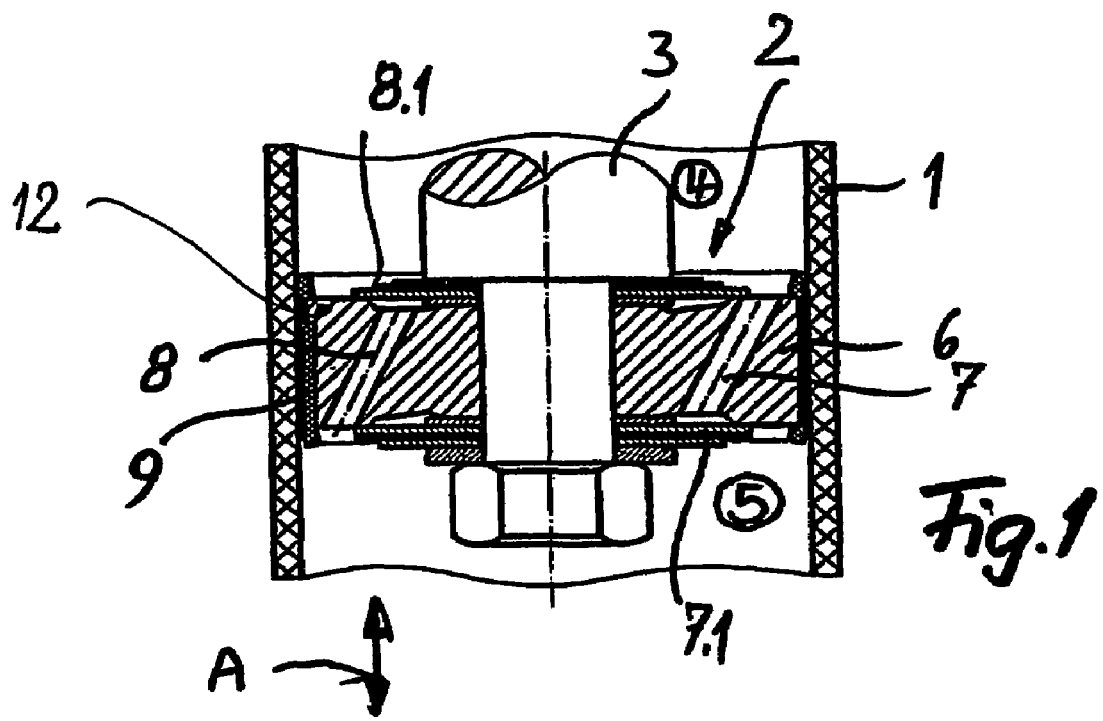
FIG. 1 shows a partial section in the axial direction through a piston-cylinder arrangement for a shock absorber.

FIG. 1 shows, as a functional schematic diagram, an axial section through a shock absorber that connects two parts with one another that can be moved relative to one another, for example a vehicle axle and a vehicle frame. The shock absorber has a cylinder part 1 that is connected to one of the two parts that can be moved relative to one another. In cylinder 1 a piston 2 is guided that is fastened to a piston rod 3, whose free end is set on the other part of the two parts that can be moved relative to one another. Here, cylinder 1 is closed at both sides and is filled with a hydraulic fluid, so that the piston-cylinder arrangement is designed to be double-acting, and the piston separates two cylinder chambers 4, 5 from one another.

Piston body 6 of piston 2 comprises a plurality of pass-through channels 7, 8 that run alongside one another. Pass-through channels 7, 8 are each covered at their exit side (whose function is still to be explained) with a throttle valve 7.1 or 8.1. The arrangement is made here in such a way that a plurality of pass-through channels 7 and a plurality of pass-through channels 8 are provided so as to be arranged about the cylinder axis in alternating fashion.

The peripheral surface of piston 2 is provided with a collar-shaped seal 9 that seals cylinder chamber 4 against cylinder chamber 5. When piston 2 moves into cylinder chamber 4, the fluid is pressed through pass-through channels 7 against the reset force of throttle valves 7.1. Pass-through openings 8 are here kept closed by the pressure of fluid chamber 4 acting on throttle valves 8.1. When there is movement in the opposite direction, pass-through channels 7 are closed by throttle valves 7.1, while the fluid can flow from cylinder chamber 5 through channels 8 back into cylinder chamber 4.

Because a piston body of the type indicated above moves back and forth, and when there is a high load collar-shaped seal 9 is also correspondingly loaded during the reverse motion, a revolving web at one end of the piston body is no longer sufficient in some circumstances to reliably fix the collar-shaped seal against loading in the axial direction. In order to permit a piston body of this type to be manufactured in a one-part construction in such a way that additional transverse grooves are present for fixing the collar-shaped seal, first a green compact is pressed from sinterable metal powder, in the shape shown in FIG. 2 and explained in more detail below, and is subsequently finally sintered to form a blank 6.1.

Blank 6.1 is provided on its peripheral surface with a multiplicity of longitudinal support webs 10 that delimit corresponding groove-shaped recesses 11 and that extend from final piston area 4.1, to which a revolving web 12 is allocated, to the other end of blank 6.1 in the area adjacent to final piston area 5.1. Revolving web 12 and longitudinal support webs 10, which form an external surface of piston body 6, are at grade with one another. In order to achieve a better representation, this external surface is hatched. Support webs 10, and, correspondingly, grooves 11, run axially parallel to one another.

Figure 2:
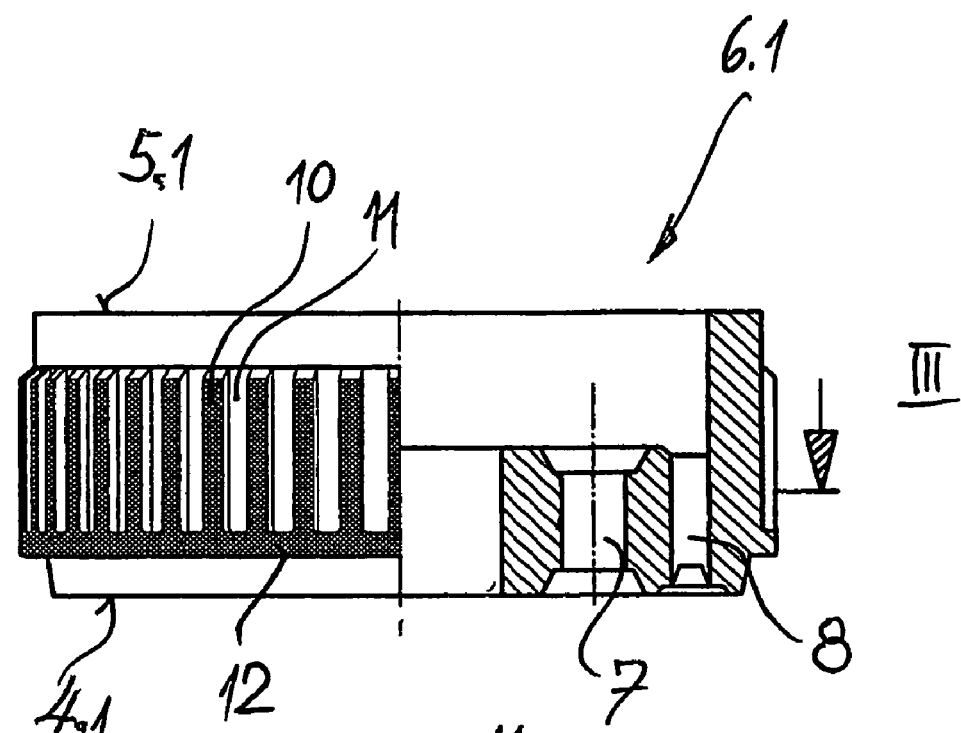
FIG. 2 shows a side view in partial section of a finally sintered blank for a shock absorber.
Figure 3:
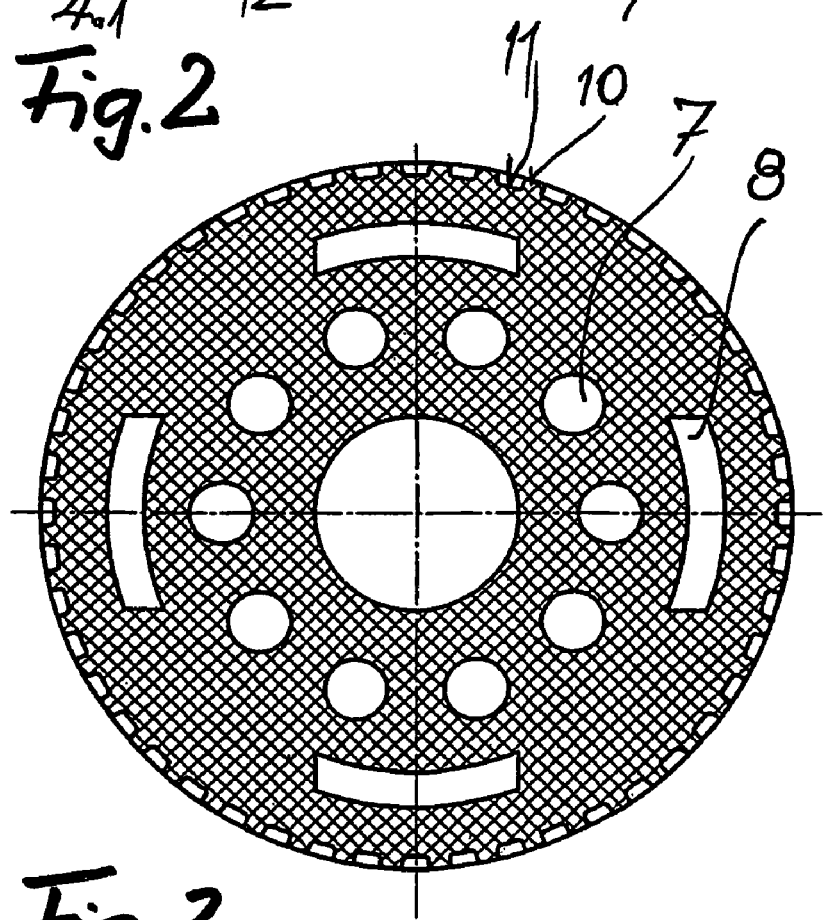
FIG. 3 shows a schematic horizontal section through the blank along the line III-III in FIG. 2, without the sealing collar.

In FIG. 3, piston body 6 is shown in a horizontal section along the line III-III in FIG. 2, so that the structure of support webs 10 and grooves 11 can be seen.

Figure 4:
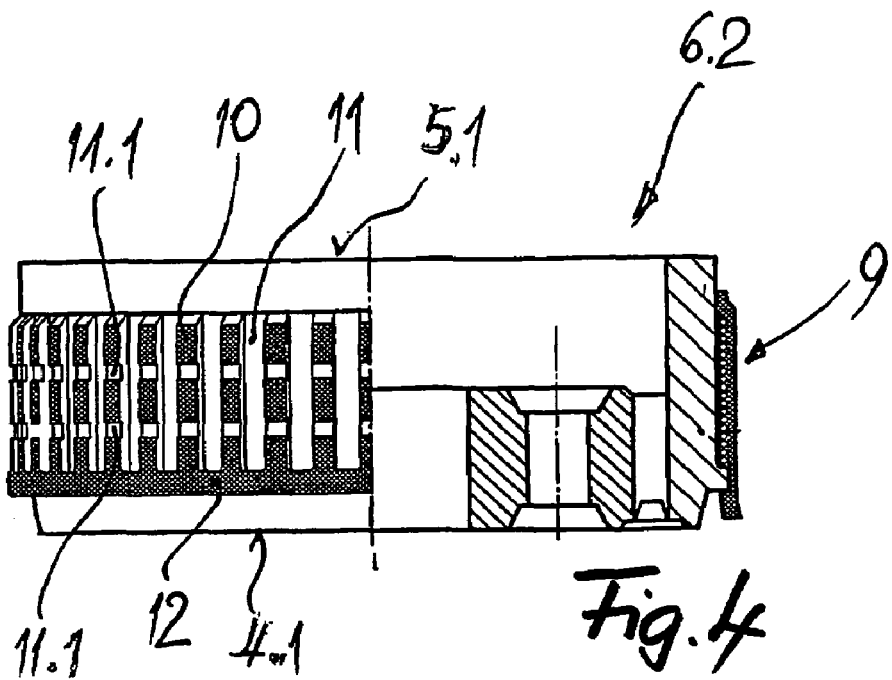
FIG. 4 shows a side view of a finally shaped piston body in partial section with the applied sealing collar.

In FIG. 4, piston body 6 is shown partially in section and in a side view without seal 9, in its final form after transverse grooves 11.1 have been made on the surface of longitudinal webs 10. Transverse grooves 11.1 are made in sintered blank 6.1 by a stamping method to be explained in more detail below, and after this stamping the blank is again calibrated. Seal 9 is then made on finally calibrated piston body 6.

Collar-shaped seal 9 situated on the periphery of piston body 6 is made of a thermally deformable plastic, preferably PTFE. In the exemplary embodiment shown here, collar-shaped seal 9 is formed onto piston body 6 by thermal deformation.

In the thermal deformation of the sealing material, which can be a pre-manufactured annular disc or a pre-manufactured tube piece, support webs 10 and revolving web 12 are formed into the material of collar-shaped seal 9 only over a part of their vertical direction, so that a certain amount of open space remains between the material of seal 9 and the floor of groove-shaped recesses 11, so that during the forming of seal 9 the sealing material can flow into groove 11 freely and without being forced. In this deformation process, the cylindrical external surface 13 of seal 9 is simultaneously calibrated, so that the desired tolerances to the inner diameter of cylinder 1 can be maintained. Because, in particular given the use of such a piston-cylinder arrangement as a shock absorber, during operation a heating of the overall system occurs, this remaining open space in the base of the groove also permits the sealing material to expand into the groove within certain limits, so that the wearing of the seal at the cylindrical peripheral surface of seal 9, adjacent to the edges, is reduced. Piston 2 is supported as a whole in practically tip-free fashion over its vertical direction. Seal 9 is supported on the one groove end on the inside of revolving web 12.

Figure 5:
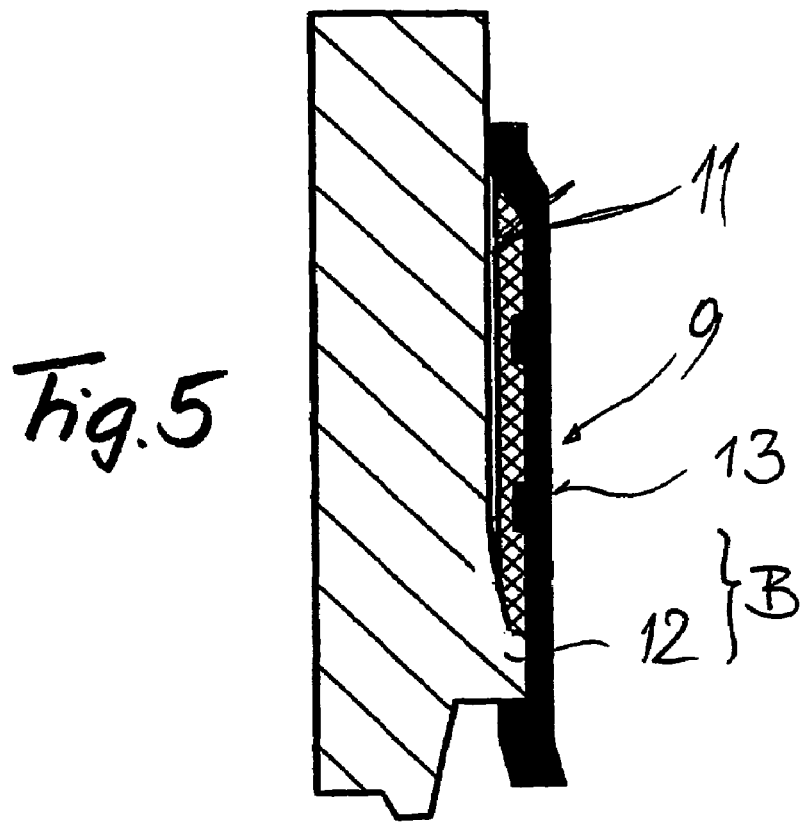
FIG. 5 shows a partial section according to FIG. 4 in an enlarged view.

In FIG. 5, the positioning of seal 9 is shown, in a greatly reduced scale, in a partial section corresponding to FIG. 4. Seal 9 is made here of a homogenous material that during the above-described thermal deformation is partly formed into longitudinal grooves 11 and transverse grooves 11.1, while on the other hand longitudinal support webs 10 and revolving web 12 are correspondingly formed into the material. To illustrate this, the material formed into longitudinal groove 11 is provided with a cross-hatching, in order to make it clear that longitudinal grooves 11 are not completely filled.

In order to avoid excessive stressing or loading, during the thermal deformation, of the material of seal 9 in longitudinal groove 11 in area of transition B to revolving web 12, it is provided that longitudinal groove 11 comprises in this area a depth that decreases, i.e., is reduced, in the direction towards revolving web 12. The reduction of the axial support surface brought about in this way for the sealing material on revolving web 12 is compensated by the additional support surfaces of transverse groove 11.1 acting in the axial direction, and the advantage is gained that in this area, which is highly stressed in later operation, the structure of the material will be less stressed by the thermal deformation, thus having a higher degree of stability.

Figure 6:
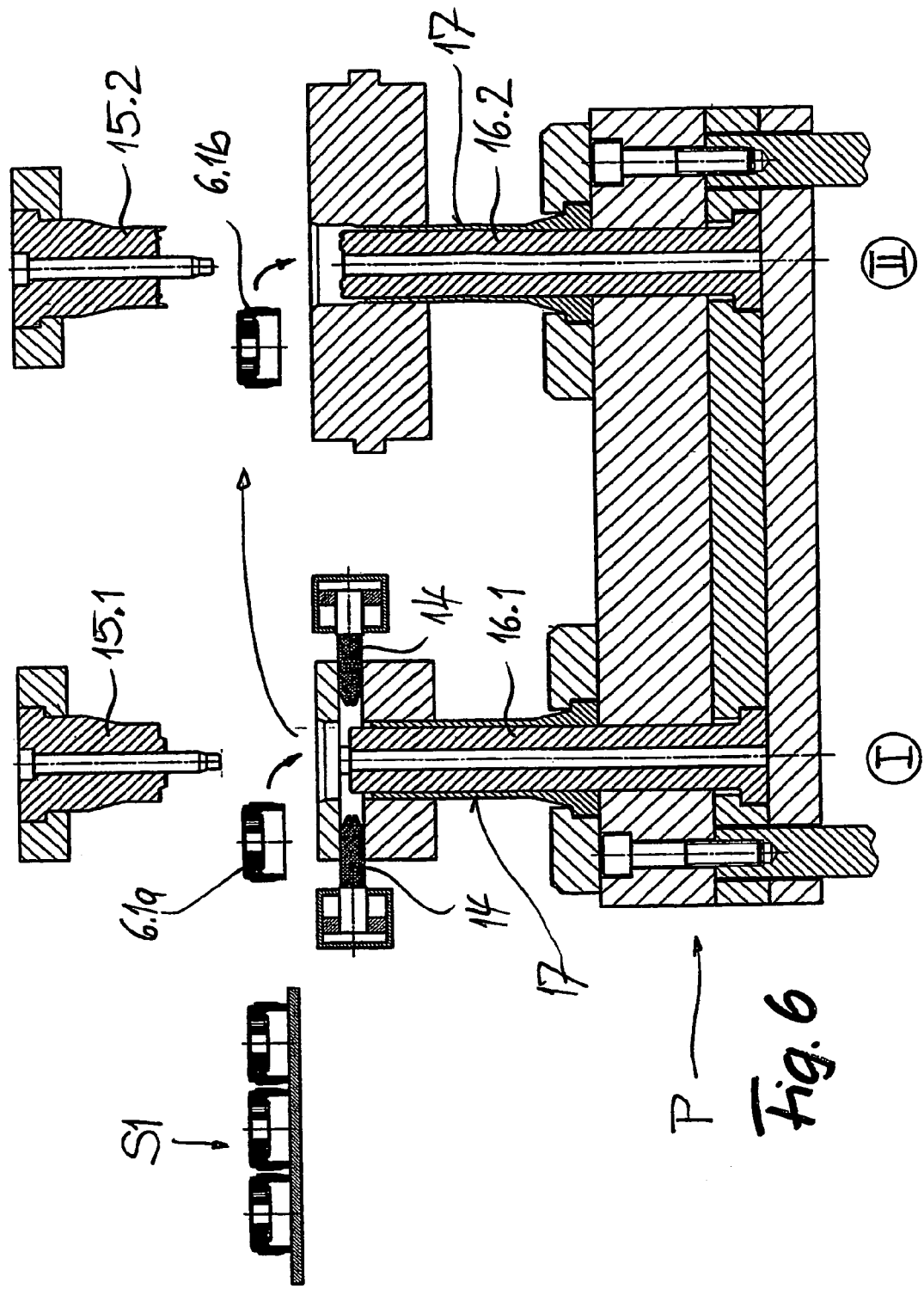
FIG. 6 shows a device for forming transverse grooves and for calibrating a piston body blank as a step of the manufacturing method.

On the basis of FIGS. 6, 7, and 8, the method according to the present invention for producing a piston body in the form shown in FIG. 4 is now explained in more detail. In a first step, a green compact corresponding to FIG. 2 is pressed from a sinterable metallurgical powder, and is subsequently finally sintered to form a blank 6.1. After this, as is shown in FIG. 6, a blank 6.1a is removed from a supply S1 of blanks 6.1, and is supplied to a pressing device P that comprises a first press location I and a second press location II.

In addition to the standard upper stamp 15.1 and lower stamp 16, first press location I is provided with radially disposed stamping tools 14 with which transverse grooves 11.1 are made in support webs 10, as is explained in more detail below.

Blank 6.1b, which was provided with transverse grooves in the preceding stamping step at press location I, is then supplied to second press location II, in which blank 6.1b prepared in this way is calibrated both in relation to the piston end surfaces and also in relation to the outer periphery of the revolving web and of the support webs, corresponding to a finished piston body 6. This process is shown in FIG. 7.

At press location II, a lower stamp 16.2 is allocated to upper stamp 15.2; the forming surface of this lower stamp corresponds to the forming surface of blank 6.1a or 6.1b that is to be inserted. In first press location I, practically speaking blank 6.1a is merely held between movable stamp 15.1 and stationary counterstamp 16.1, while in second press location II press stamp 15.2 is subjected to pressure such a way that a calibrating final formation of inserted blank 6.1b takes place, so as to form finished piston body 6.

As is shown in FIG. 8, press stamp 15 is subsequently drawn back, and an ejection tool 17 at both press locations is used to push blank 6.1b, now provided with transverse grooves, and finally calibrated piston body 6 out of the press form, so that blank 6.1b can be transported to press location II and finished piston body 6 can be stored in a storage area S2, from which the finished piston body can then be removed for the application of collar-shaped seal 9.

FIG. 9 shows, in a vertical section through first press location I, the arrangement with blank 6.1a in place. Drawn-in upper stamp 15.1 is not shown here. Stamping tools 14 are pressed into the material of support webs 10, and transverse grooves 11.1 are formed. This can be seen in the enlarged view in FIG. 10.

Radially adjustable stamping tools 14 are fashioned as slides, and, as can be seen from FIGS. 6, 7, 10, and 11, can be adjusted radially against blank 6.1a. In the specific embodiment shown here, three stamping tools 14 are provided, situated at the same angular distance from one another. Depending on the size of the system, more than three stamping tools may be provided. The provision of only two stamping tools situated diametrically opposite one another is also possible in principle.

As can be seen from the enlarged view according to FIG. 10, for the formation of two transverse grooves 11.1 in support webs 10 of a blank 6.1 each stamping tool 14 has two parallel blade-type stamping edges 18, which are used to displace material when pressure is applied by stamping tools 14, with cold deformation of the sintered material corresponding to FIG. 7, forming transverse grooves 11.1. As can be seen from FIG. 10, this cold deformation takes place only over a part of the overall vertical direction of support web 10, so that transverse grooves 11.1 result, having a smaller depth than grooves 11.

The forming and calibrating process can also be carried out using only one press location whose design is essentially that of press location I. Only the upper stamp and the lower stamp are formed corresponding to upper stamp 15.2 and to lower stamp 16.2. Correspondingly, in the first step blank 6.1a is merely held by the upper stamp and the lower stamp, so that transverse grooves 11.1 can be formed in it. Subsequently, stamping tools 14 are drawn back and the pressure on the upper stamp and the lower stamp is increased, and the blank is calibrated; only then is the form removed as a finished piston body.

The invention claimed is:

1. A method for producing a one-part piston body for a piston-cylinder arrangement, in particular a shock absorber piston, that is provided on its peripheral surface in an area adjacent to a final piston area with a revolving web that protrudes beyond the peripheral surface, to which longitudinal support webs are adjacent that extend to the other final piston area and that are disposed parallel to and at a distance from each other, each pair of adjacent support webs delimiting a groove-shaped recess, the ends opposite the revolving web of said recesses being open in the longitudinal direction, said method comprising in a first step a green compact comprising the revolving web and the longitudinal support webs is pressed from a sinterable metallurgical powder, and in a second step the green compact is finally sintered to form a blank, and in a third step radially disposed stamping tools are used to form, under material displacement, at least two transverse grooves into at least a part of each longitudinal support web so that each support web is at least divided into three longitudinal parts, through cold deformation, and in a fourth step the blank provided in this way with transverse grooves is calibrated to its final form through pressing with calibrating tools.

2. The method according to claim 1, wherein at least two stamping tools that can be pressed radially against the blank are used, each comprising at least one blade-type stamping edge.

3. The method according to claim 1, wherein a pressing device having at least two press locations is used, such that one of the blanks is provided with transverse grooves in the first press location, while another one of the blanks, which has already been provided with the transverse grooves, is simultaneously calibrated in the second press location (II).

4. The method according to claim 1, wherein in the third step for producing the transverse grooves, the blank is generally held by a movable upper stamp and a stationary lower stamp while the transverse grooves are made in the support webs by the radially disposed stamping tool over a depth less than the depth of the groove-shaped recess.

5. The method according claim 1, wherein in the fourth step the blank is calibrated in relation to the final piston areas and in relation to the external periphery of the circumferential web and of the support webs by a movable upper stamp, to which pressure is applied and by a stationary lower stamp, while the radially disposed stamping tool is moved into the transverse grooves.

6. A method for producing a one-part piston body for a piston-cylinder arrangement, in particular a shock absorber piston, that is provided on its peripheral surface in an area adjacent to a final piston area with a revolving web that protrudes beyond the peripheral surface, to which longitudinal support webs are adjacent that extend to the other final piston area and that are disposed parallel to and at a distance from each other, each pair of adjacent support webs delimiting a groove-shaped recess, the ends opposite the revolving web of said recesses being open in the longitudinal direction, said method comprising in a first step a green compact comprising the revolving web and the longitudinal support webs is pressed from a sinterable metallurgical powder, and in a second step the green compact is finally sintered to form a blank, and in a third step radially disposed stamping tools are used to form, under material displacement, transverse grooves into at least a part of the support webs through cold deformation, and in a fourth step, the blank provided in this way with transverse grooves is calibrated to its final form through pressing with calibrating tools, wherein a pressing device having at least two press locations is used, such that one of the blanks is provided with transverse grooves in the first press location, while another one of the blanks, which has already been provided with the transverse grooves, is simultaneously calibrated in the second press location (II).

7. The method according to claim 6, wherein in the third step for producing the transverse grooves, the blank is generally held by a movable upper stamp and a stationary lower stamp while the transverse grooves are made in the support webs by the radially disposed stamping tool over a depth less than the depth of the groove-shaped recess.

8. A method for producing a one-part piston body for a piston-cylinder arrangement, in particular a shock absorber piston, that is provided on its peripheral surface in an area adjacent to a final piston area with a revolving web that protrudes beyond the peripheral surface, to which longitudinal support webs are adjacent that extend to the other final piston area and that are disposed parallel to and at a distance from each other, each pair of adjacent support webs delimiting a groove-shaped recess, the ends opposite the revolving web of said recesses being open in the longitudinal direction, said method comprising in a first step a green compact comprising the revolving web and the longitudinal support webs is pressed from a sinterable metallurgical powder, and in a second step the green compact is finally sintered to form a blank, and in a third step radially disposed stamping tools are used to form, under material displacement, transverse grooves into at least a part of the support webs through cold deformation, wherein the blank is generally held by a movable upper stamp and a stationary lower stamp while the transverse grooves are made in the support webs by the radially disposed stamping tool over a depth less than the depth of the groove-shaped recess, and in a fourth step the blank provided in this way with transverse grooves is calibrated to its final form through pressing with calibrating tools.

9. The method according to claim 8, wherein a pressing device having at least two press locations is used, such that one of the blanks is provided with transverse grooves in the first press location, while another one of the blanks, which has already been provided with the transverse grooves, is simultaneously calibrated in the second press location (II).

10. The method according claim 8, wherein in the fourth step the blank is calibrated in relation to the final piston areas and in relation to the external periphery of the circumferential web and of the support webs by a movable upper stamp, to which pressure is applied and by a stationary lower stamp, while the radially disposed stamping tool is moved into the transverse grooves.

11. A method for producing a one-part piston body for a piston-cylinder arrangement, in particular a shock absorber piston, that is provided on its peripheral surface in an area adjacent to a final piston area with a revolving web that protrudes beyond the peripheral surface, to which longitudinal support webs are adjacent that extend to the other final piston area and that are disposed parallel to and at a distance from each other, each pair of adjacent support webs delimiting a groove-shaped recess, the ends opposite the revolving web of said recesses being open in the longitudinal direction, said method comprising in a first step a green compact comprising the revolving web and the longitudinal support webs is pressed from a sinterable metallurgical powder, and in a second step the green compact is finally sintered to form a blank, and in a third step radially disposed stamping tools are used to form, under material displacement, transverse grooves into at least a part of support webs through cold deformation, and in a fourth step the blank provided in this way with transverse grooves is calibrated to its final form through pressing with calibrating tools, wherein the blank is calibrated in relation to the final piston areas and in relation to the external periphery of the circumferential web and of the support webs by a movable upper stamp, to which pressure is applied and by a stationary lower stamp, while the radially disposed stamping tool is moved into the transverse grooves.

12. The method according to claim 11, wherein in the third step for producing the transverse grooves, the blank is generally held by a movable upper stamp and a stationary lower stamp while the transverse grooves are made in the support webs by the radially disposed stamping tool over a depth less than the depth of the groove-shaped recess.

* * * * *